United States Patent
Yu et al.

[19]

[11] Patent Number: 6,145,860
[45] Date of Patent: Nov. 14, 2000

[54] HYDRAULIC FLUID RESERVOIR

[75] Inventors: Xudong Yu, Portage, Mich.; Gregory A. Schmidt, Sussex; Michael S. Schultz, Menomonee Falls, both of Wis.

[73] Assignee: Applied Power Inc., Butler, Wis.

[21] Appl. No.: 09/280,044

[22] Filed: Mar. 26, 1999

Related U.S. Application Data

[60] Provisional application No. 60/079,549, Mar. 27, 1998.

[51] Int. Cl.[7] ........................................ B60G 7/00
[52] U.S. Cl. ...................... 280/124.159; 280/5.5
[58] Field of Search ............... 280/5.5, 124.157, 280/124.158, 124.159, 124.16, 124.161, 5.502, 5.506, 5.509, 5.514

[56] References Cited

U.S. PATENT DOCUMENTS

| | | |
|---|---|---|
| 3,846,983 | 11/1974 | Freedy et al. ............................ 60/478 |
| 3,996,999 | 12/1976 | Termont et al. .......................... 165/41 |
| 4,026,319 | 5/1977 | Pickering ................................. 137/255 |
| 4,064,911 | 12/1977 | Albrecht .................................. 138/30 |
| 4,199,950 | 4/1980 | Hakanson et al. ...................... 60/605 |
| 4,343,697 | 8/1982 | Miller et al. ............................. 210/90 |
| 4,441,520 | 4/1984 | Bruso et al. ............................. 137/44 |
| 4,488,404 | 12/1984 | Arakawa et al. ........................ 60/535 |
| 5,703,569 | 12/1997 | Oliver et al. ............................ 340/605 |
| 5,718,281 | 2/1998 | Bartalone et al. ....................... 165/41 |

*Primary Examiner*—Kevin Hurley
*Assistant Examiner*—Kevin McKinley
*Attorney, Agent, or Firm*—Quarles & Brady LLP

[57] ABSTRACT

A reservoir for a hydraulic suspension system for a motor vehicle has two vents disposed diagonally opposite relative to the direction of travel of the vehicle. A level sensor and filter are formed which fit together and to the reservoir, with the level sensor extending through and beneath the filter. The bottom of the reservoir tapers so as to direct hydraulic fluid toward the hydraulic fluid pick-up of a pump which is mounted in a sidewall of the reservoir.

12 Claims, 6 Drawing Sheets

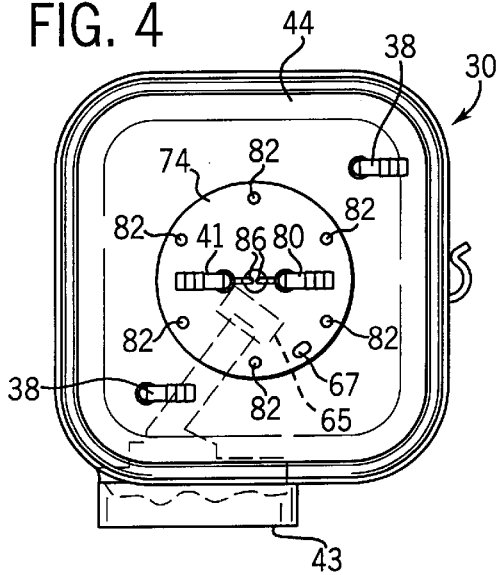
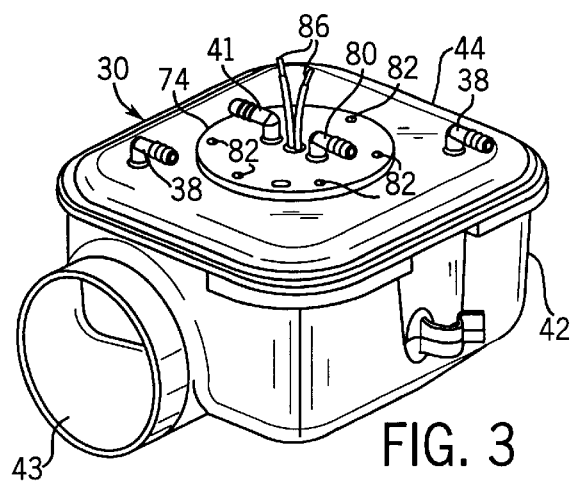
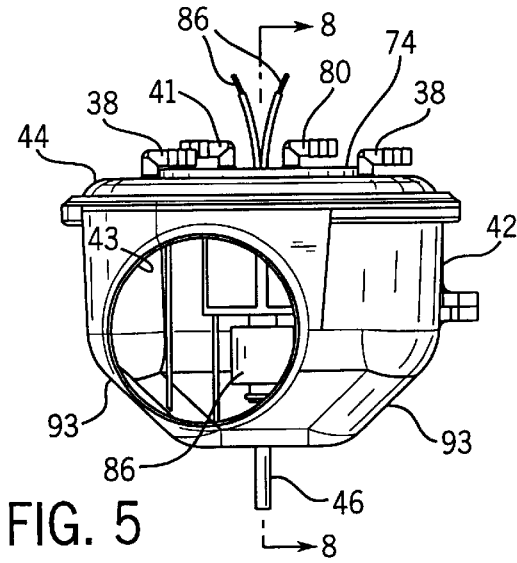
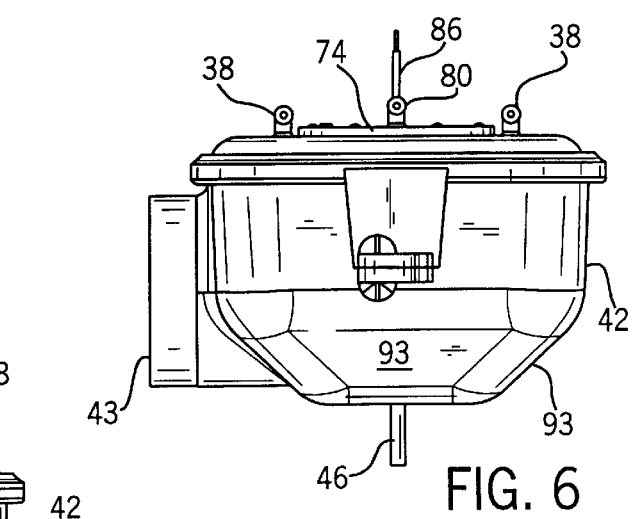
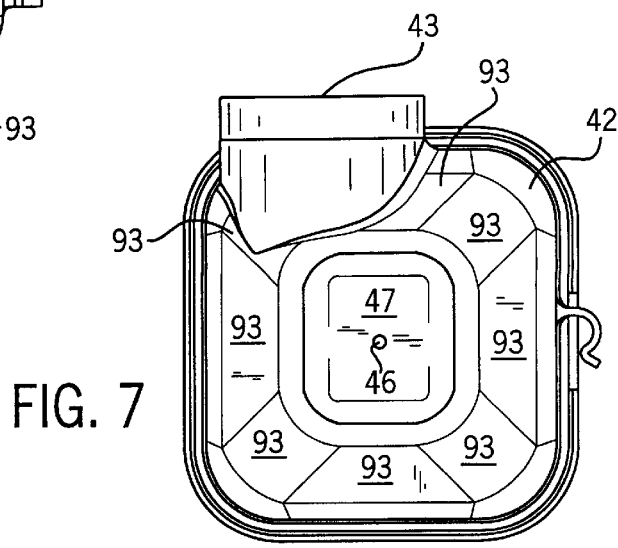

HYDRAULIC FLUID RESERVOIR

CROSS-REFERENCE TO RELATED APPLICATIONS

This claims the benefit of U.S. Provisional Patent Application Ser. No. 60/079,549 filed Mar. 27, 1998.

STATEMENT REGARDING GOVERNMENT SPONSORED RESEARCH OR DEVELOPMENT

Not applicable.

FIELD OF THE INVENTION

This invention relates to a hydraulic fluid reservoir, and in particular to a hydraulic fluid reservoir for a hydraulic vehicle suspension system.

BACKGROUND OF THE INVENTION

U.S. Pat. No. 5,601,307 discloses a vehicle suspension system in which a double-acting hydraulic ram supports the vehicle at each wheel with the ram chambers at opposite diagonal corners of the vehicle cross-connected so as to provide four discrete hydraulic wheel circuits. A load distribution unit is connected to the four hydraulic circuits for hydraulically equalizing the pressures in the circuits. FIG. 5 of U.S. Pat. No. 5,601,307 discloses a load distribution unit (LDU) 140 which includes a pair of cylinders, each containing a double-acting ram that divides the cylinder which contains it into four variable volume chambers, one chamber at each end of the ram and two chambers inward of the two end chambers, each chamber being isolated from all the others. Each of the inward chambers communicates with a different one of the wheel circuits, with each LDU cylinder being connected to the same chambers of the wheel cylinders on opposite sides of the vehicle, i.e. one of the inward chambers of one of the LDU cylinders is connected to the wheel cylinder circuit that connects the front left upper wheel cylinder with the rear right lower wheel cylinder, and the other inward chamber of the same LDU cylinder is connected to the wheel circuit that connects the front right upper wheel cylinder with the rear left lower wheel cylinder. In the same manner, the other LDU cylinder is connected to the two wheel circuits that connect the front lower wheel cylinders with the rear upper wheel cylinders. A total of six (one for each of the four inward chambers, plus one for each of the two end chambers of different LDU cylinders that are connected) solenoid-operated pressure supply valves 204 are supplied for providing hydraulic fluid under pressure to the various chambers of the LDU, and a total of six pressure relief or drain valves 215 are provided for relieving pressure from the various chambers. In addition, a reservoir 66 is provided for the hydraulic fluid, together with a pump 65 and gas-charged accumulators 202 for maintaining pressure in the system.

The reservoir in such a system must be easily fillable and maintainable, reliable and inexpensive. The volume of fluid contained in the reservoir is constantly changing, according to the needs of the suspension system. The attitude of the vehicle may also be constantly changing, for example from being level, to being at ±45°. Therefore, the reservoir must also be capable of supplying and receiving fluid at high angles, e.g. 45°, of vehicle inclination, and at high flow rates, on demand of the suspension system. The present invention provides a reservoir which contributes to the solution of these problems.

SUMMARY OF THE INVENTION

A useful feature of the invention is the arrangement of breather holes in the reservoir. The breather holes are provided at diagonally opposite corners of the reservoir to insure that the reservoir is always open to a flow of atmospheric air into or out of it, unobstructed by hydraulic fluid. When at a high angle of attitude, the fluid in the reservoir, the surface of which always seeks to be level, can only cover one of the breather holes. Thereby, the other breather hole permits the unobstructed entry and egress of air into and out of the reservoir to make up for changes in the volume of fluid contained in the reservoir.

Another aspect of the invention is providing a fluid level indication switch in the filter assembly of the reservoir, which has the advantages of economy, modularity and ease of assembly and repair. The level sensor extends through and below the filter. The sensor and filter are two separable components, which can be disassembled from the reservoir for repair, reuse or replacement. The sensor is part of a cover of the filter, in which is formed the fluid inlet, and which serves to secure the sensor and the filter to the reservoir.

The useable volume of the reservoir is maximized by mounting the pump in a sidewall of the reservoir, and tapering the lower portions of the sidewalls toward the center of the bottom, so as to direct fluid toward the pump intake which is extended away from the pump to be adjacent to the lowest part of the bottom of the reservoir. Thereby, the most hydraulic fluid is contained in the smallest space, without the pump adding to the necessary space required for the reservoir/pump power unit.

These and other objects and advantages of the invention will become apparent from the detailed description and drawings.

BRIEF DESCRIPTION OF THE DRAWINGS

FIG. 3 is a perspective view of the reservoir alone;

FIG. 4 is a top plan view of the reservoir;

FIG. 5 is a left side plan view of the reservoir;

FIG. 6 is a front plan view of the reservoir;

FIG. 7 is a bottom plan view of the reservoir;

DETAILED DESCRIPTION OF THE PREFERRED EMBODIMENT

Figure 1:
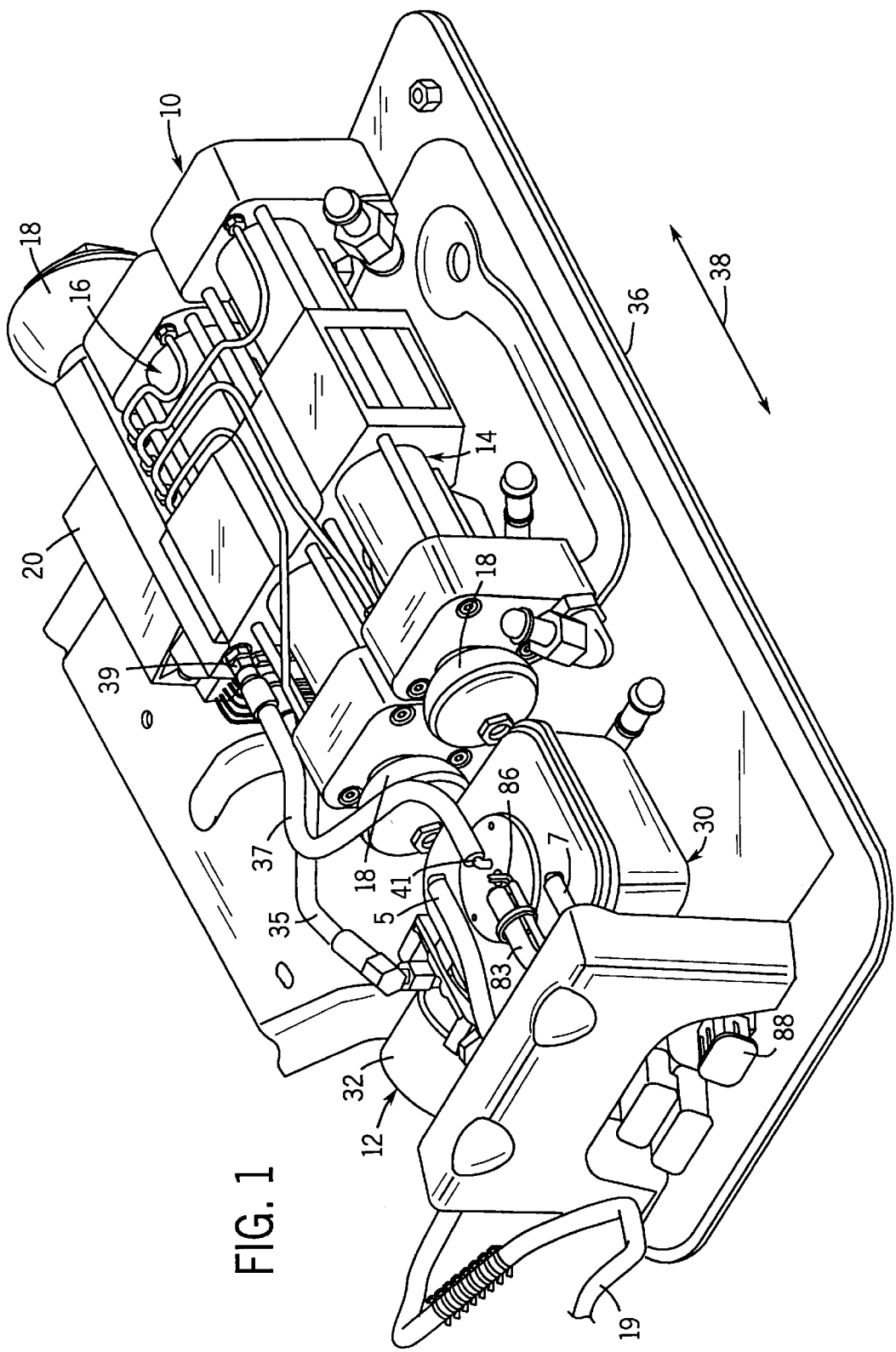
FIG. 1 is a perspective view of an LDU, a power unit incorporating the invention and a mounting plate for a hydro pneumatic vehicle suspension system.

FIG. 1 illustrates an LDU 10 and power unit 12 which may be used in a vehicle suspension system of the type described in U.S. Pat. No. 5,601,307, the disclosure of which is hereby incorporated by reference. The LDU 10 includes a pair of cylinders 14 and 16, a number of accumulators 18, and two valve banks 20 (only one shown).

The power unit 12 includes a reservoir 30 and a motor/pump unit 32. The LDU 10 and power unit 12 are mounted on a skid plate 36 which is bolted to the chassis of the vehicle, for example, to the bottom outside of the passenger compartment under the driver's seat area of the vehicle, so that the fore-aft direction of the vehicle (the direction of travel) is represented by the arrow 38 in FIG. 1.

Although the power unit 12 is described as being usable with the LDU illustrated and the vehicle suspension system described in FIG. 5 of U.S. Pat. No. 5,601,307, it should be understood that the power unit 12 could be used with any hydro-pneumatic vehicle suspension system, not just the one illustrated and described.

The purpose of the reservoir 30 is to contain in reserve a supply of hydraulic fluid to be provided under pressure by the motor/pump 32 to the LDU upon demand of the LDU, and to receive hydraulic fluid from the LDU when the LDU sends fluid to the reservoir. Pressure line 35 connects the pump outlet with the LDU inlet and return line 37 provides communication between the LDU tank port 39 and the inlet 41 of the reservoir 30. The motor pump 32 and the valves in the supply and relief valve banks 20 are operated in response to signals from an electronic control unit (e.g., ECU 68 in FIG. 5 of U.S. Pat. No. 5,601,307) to supply hydraulic fluid to or remove hydraulic fluid from the various subcircuits of the vehicle suspension system including the reservoir, to maintain the vehicle level or to change the elevation of the vehicle relative to the wheels. Thus, the reservoir must be ready to supply fluid to or receive fluid from the system upon demand, and at the flow rates required.

Referring particularly to FIGS. 3–8, the reservoir 30 is molded plastic, for example, high impact co-polymer polypropylene. The reservoir 30 includes a lower tank portion 42 and a cover 44. The cover 44 is sealed all the way around to the top of the tank, such as by hot plate welding as shown at 43, an adhesive, an elastomeric seal, or any other suitable means. It may also be possible to mold the tank and cover in one piece. A bolt 46 for mounting the reservoir 30 to the plate 36 is molded into the bottom wall 47 of the tank portion 42.

Figure 2:
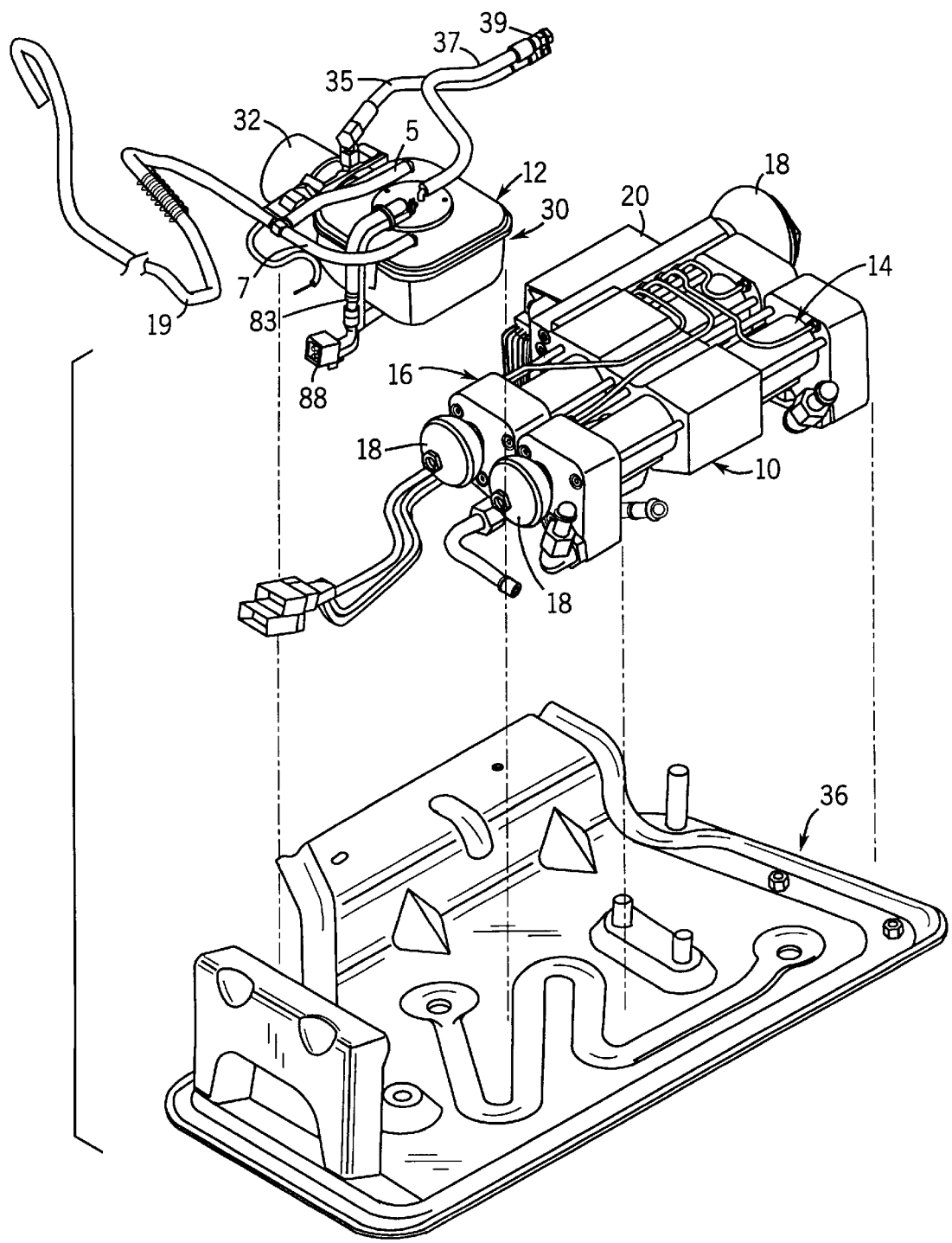
FIG. 2 is an exploded perspective view of the components of FIG. 1.

The cover 44 includes two vents provided by tube connectors 38 at diagonally opposite corners of the cover 44, each of which is tubular and opens into the interior of the hollow reservoir 30. As shown in FIGS. 1 and 2, tubes 5 and 7 each communicate with one of the connectors 38. A small mesh (e.g., 10 micron, Goretex®, or the like) filter screen is provided in the end of each connector 38, in each tube 5, 7 or elsewhere along the intake air path to prevent dirt particles from entering the reservoir 30. Tubes 5 and 7 are joined together by a conventional T-connector, which is also connected to a tube 19 which has its opposite end located in a position such that the intake air entering it is relatively clean, for example, in the trunk area of the vehicle. Another filter may also be provided in that end of the tube 19.

The connectors 38 provide two vents that communicate atmospheric pressure to the diagonally opposite corners of the top of the reservoir 30. Providing the vents at diagonally opposite corners of the top wall of the reservoir 30, and orienting the reservoir 30 with its longitudinal axis 39 extending parallel to the fore and aft direction of travel 38 relative to the vehicle such that the vents are aligned along a line 40 which is at an angle to the direction of travel 38, which is the direction of the longitudinal axis of the vehicle. This angle is 45° in the preferred embodiment, as preferred for symmetry in both directions of lateral inclination of the vehicle.

This construction and orientation of the vents ensures that at least one of the vents will be open to the atmosphere at all times, even when the vehicle is operating at a high level of inclination such that one of the vents is covered with hydraulic fluid. When the vent is covered with oil, it can become clogged with hydraulic fluid, or its filter can become clogged with hydraulic fluid. Thus, even if one vent is clogged by hydraulic fluid, air is free to enter or exit the reservoir 30 through the other hole 40. It is important to have at least one vent free breathing at all times, as at any time the suspension system may dump a relatively large volume of fluid to the reservoir, which if both vents are plugged would excessively pressurize the reservoir, possibly leading to bursting of the reservoir.

A large hole 41 is formed in the center of the top 44 and at the bottom of the hole an inwardly turned flange 48 is formed. Referring to FIGS. 8 and 9–11, a filter element 50 has a plastic cage 56 with an external peripheral flange 52 which is supported by the flange 48. The filter element 50 includes a cylindrical screen filter 54 which is supported and closed off at the edges of the screen by the cage 56. The cage 56 is integral with a hollow stem 58 which extends downwardly from the center of the closed lower end 60 of the cage 56. The filter 54 may be inserted in the plastic mold for the cage 56 and stem 58 so that the plastic of the cage 56 flows through the screen to support it with vertical ribs 64, and so that the upper and lower edges of the screen 54 are encapsulated by the cage all of the way around the cage. That is so that fluid entering the interior of the filter element 50 must go through the screen and be filtered thereby before it enters the part of the reservoir which is outside of the filter element, to be held in reserve until it is sucked back up by the pump inlet 65.

The filter element cage 56 extends upwardly from the flange 52 and has an outer peripheral groove in which is received an o-ring 70. The o-ring 70 makes a fluid tight seal between the filter element 50 and the inner circumference of a downwardly depending annular flange 72 of filter cover 74. The exterior circumference of the flange 72 is sealed to the inner circumference of the hole 41 by an o-ring seal 78. Two tube connectors 41 and 80 are molded into the top of the filter cover 74, so as to open to the interior of the filter element 50, so that inflow must flow through the screen 54. As described above, the connector 41 is for connection to tank return line 37 from the LDU. The connector 80 is for connection to a fill line 83 which is accessible from below plate 36 for filling the system, and is normally plugged.

A level sensor 63, for example a magnetic Hall effect sensor or a magnetically actuated reed switch, having lead wires 86 and connector 88 is potted as shown at 89 in a sensor tube 90 using any appropriate potting compound. The sensor tube 90 extends downwardly from the center of and is integrally molded with the plastic filter cover 74. The sensor tube 90 extends into the stem 58. The filter cover 74 is secured to the top 44 by hot staking projections 82 which are molded into the top 44 and extend through holes in the filter cover 74. An oblong projection 67 may also be provided in the top 44 which fits into a similarly shaped hole in the cover 74 to orient the cover 74 relative to the top 44. A donut shaped float 86 containing a magnet or other actuator for triggering the sensor is slidably mounted on the stem and secured thereon by a snap ring 88. The float 86 slides up and down on stem 58 according to the level of fluid in the reservoir 30. The magnetic sensor or switch to which wires 86 are connected is normally closed when there is sufficient fluid in the reservoir 30 to float the float 86 at an adequately high level so as not to actuate the sensor or switch. When the float 86 moves down, due to a decreasing volume of fluid in the reservoir 30, when the permanent magnet which it carries moves into proximity of the sensor or switch, the magnetic field of the magnet acts on the sensor or switch to open it. Accordingly, the continuity of the wires 86 is broken, which can be used to signal that fluid needs to be added to the reservoir 30, via fill line 83, for example by providing that signal to the electronic control unit of the vehicle, which would process it into a signal which is communicated to the vehicle operator.

The reservoir 30 also has a large motor/pump unit mounting hole 43 formed in its side for mounting the motor/pump unit 32 to the reservoir 30. A hose clamp may be used to clamp tubular mounting portion 92 against a similarly cylindrical surface of the pump 32. This construction reduces the overall height of the power unit 12 so that it fits beneath the chassis of the vehicle without unduly reducing the ground clearance of the skid plate 36.

Figure 8:
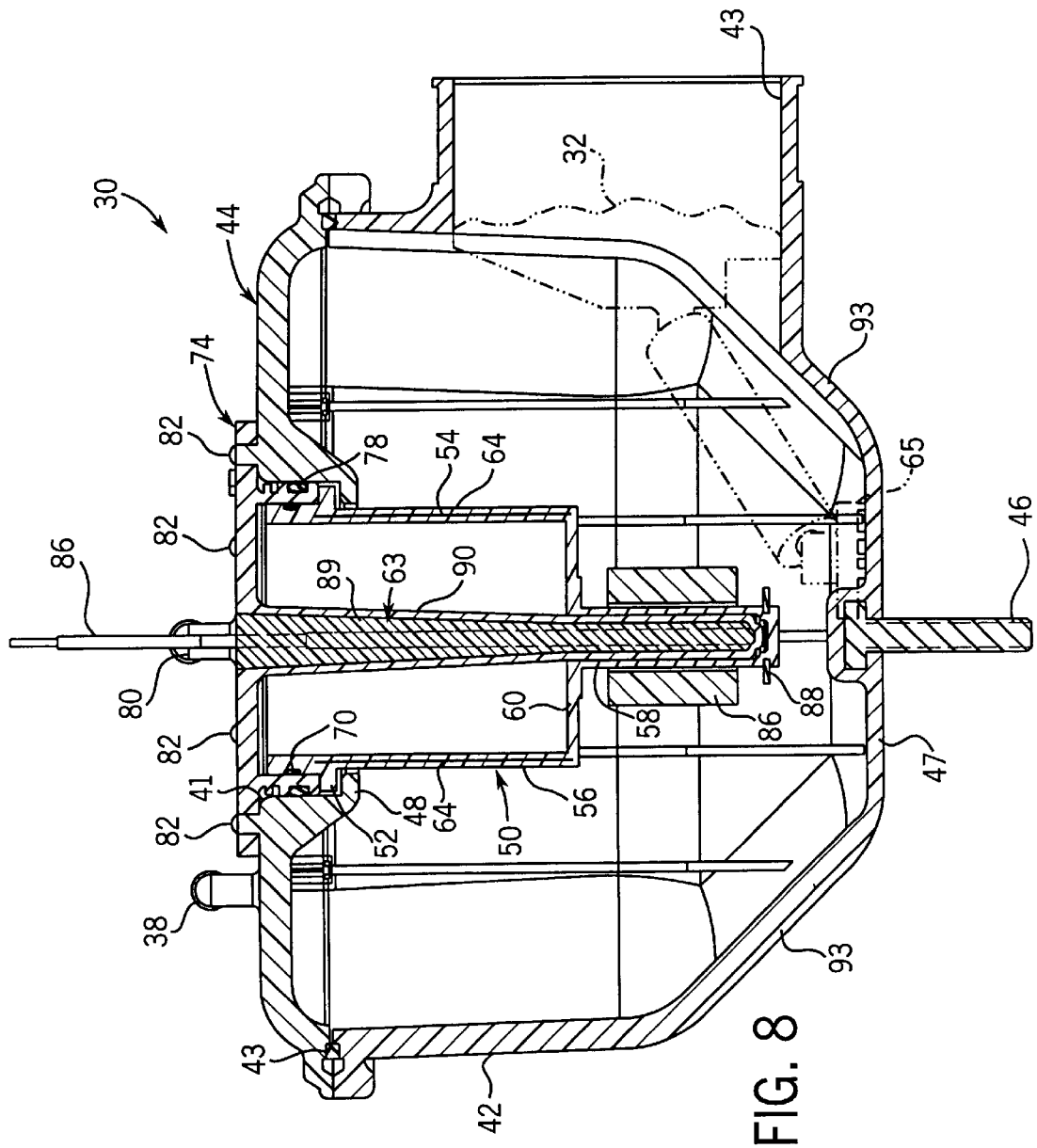
FIG. 8 is a lateral (relative to the direction of movement of the vehicle) cross-sectional view of the reservoir from the plane of the line 8—8 of FIG. 5.
Figure 9:
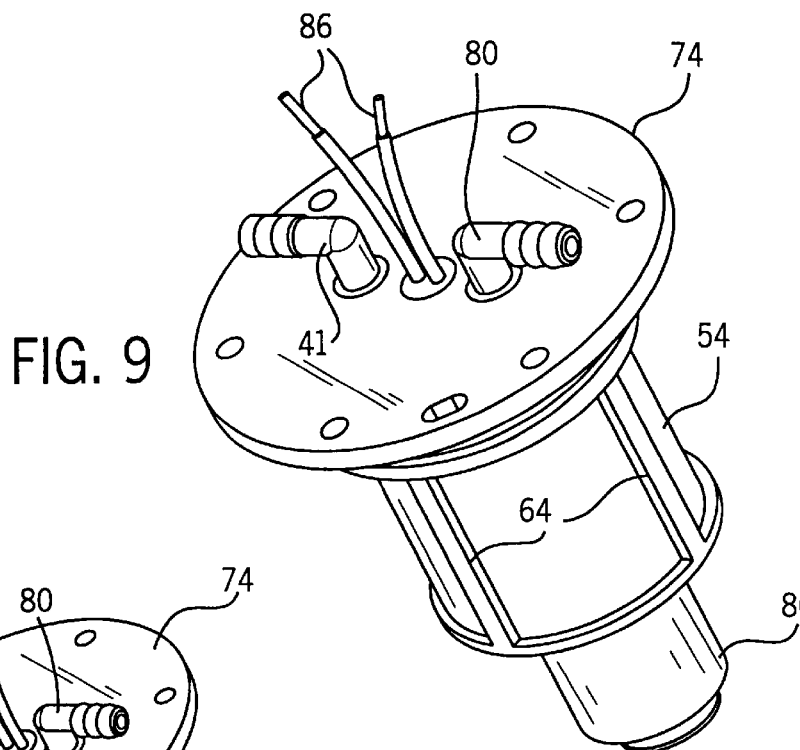
FIG. 9 is a perspective view of a level switch and filter assembly for the reservoir.
Figure 10:
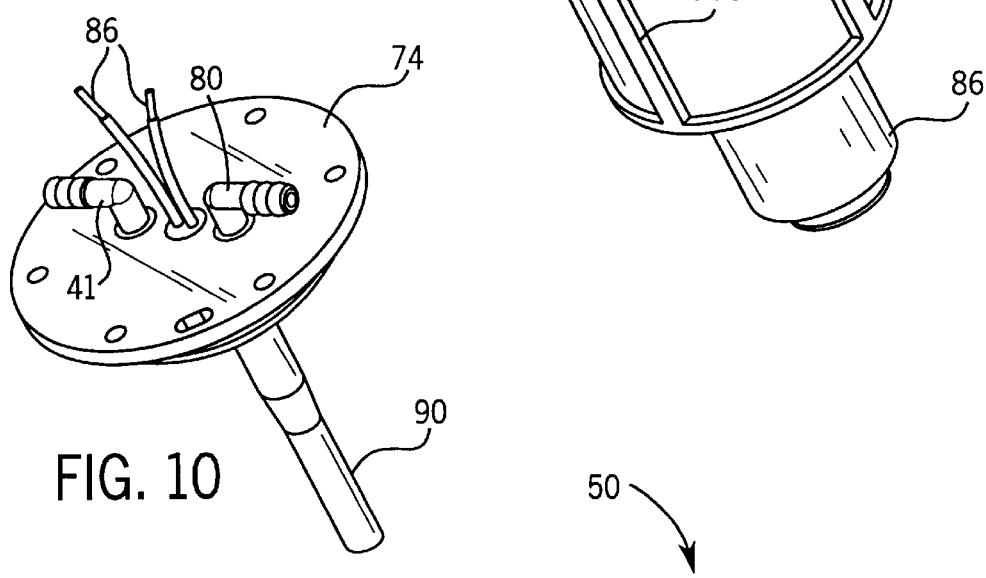
FIG. 10 is a perspective view of a switch/mounting plug portion of the switch and filter assembly.

The intake 65 of the pump 32 is shown in phantom in FIGS. 4 and 8. The intake 65 is positioned closely adjacent to the bottom wall 47 to maximize the usable volume of the reservoir 30. Further to this purpose, the bottom wall 47 is sloped upwardly at its periphery at walls 93 to direct fluid toward the center of the bottom wall, where the intake 65 is located.

Figure 11:
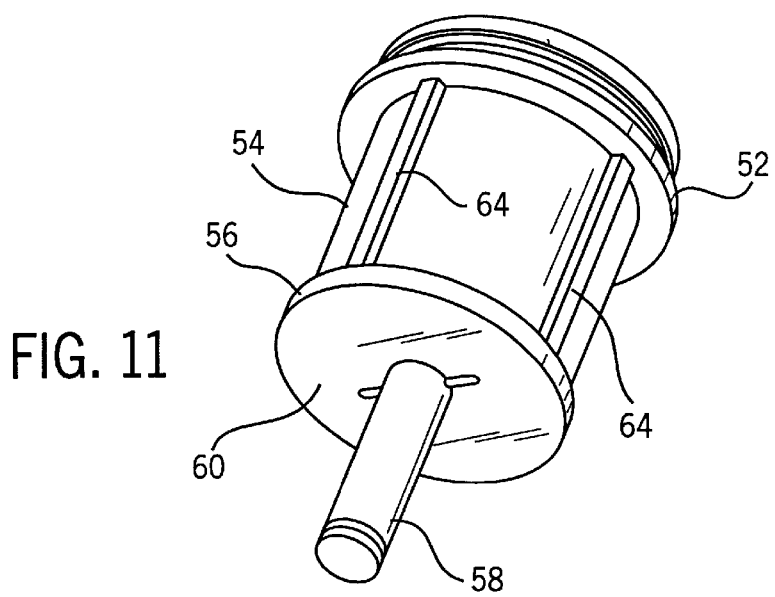
FIG. 11 is a perspective view of a filter element portion of the switch and filter assembly.
Figure 13:
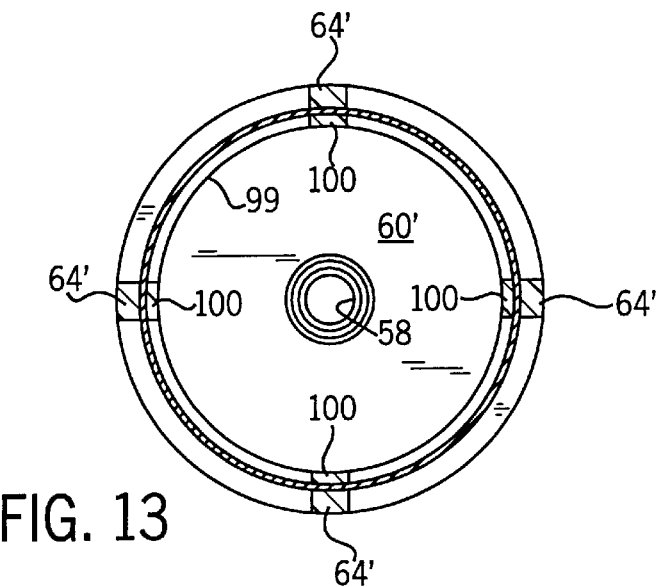
FIG. 13 is a cross-sectional view from the plane of the line 13—3 of FIG. 12.
Figure 12:
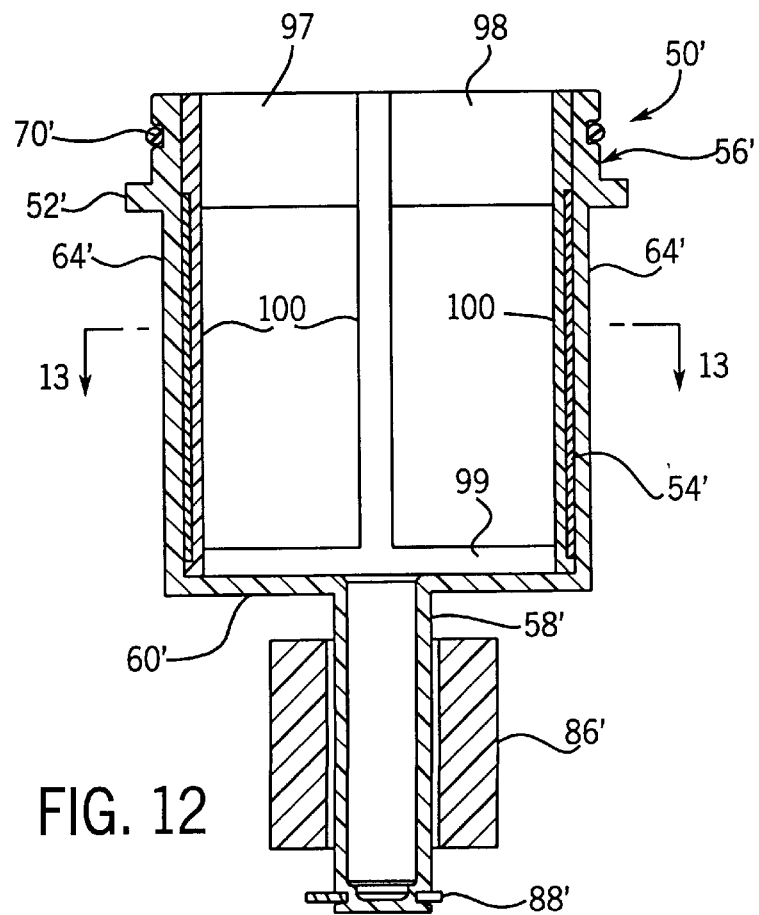
FIG. 12 is a cross-sectional view from the plane of the longitudinal axis of an alternate embodiment of the filter element.

FIGS. 11 and 12 illustrate an alternate embodiment 50' of the filter element, labelled with the same reference numbers plus a prime (') sign. This is the same as the filter element 50, except that the filter screen 54' is not an insert in the plastic mold of the cage 56', but is wrapped around a plastic filter carrier 97 having upper 98 and lower 99 rings joined by four ribs 100, which are lined up with the ribs 64' of the cage 56'. The carrier 97 is then inserted into the cage 56', and may be adhered thereto, or not, in which case it is kept in the cage 56' by the cover 74.

A preferred embodiment of a reservoir for a hydraulic vehicle suspension unit has been described in detail. Modifications and variations of the preferred embodiment will be apparent to those skilled in the art. Therefore, the invention should not be limited to the embodiment described, but should be defined by the claims which follow.

We claim:

1. In a hydraulic vehicle suspension system having a hydraulic fluid reservoir for receiving, containing and supplying a reserve volume of hydraulic fluid for use by said system, the improvement wherein said reservoir is provided with two vents, said vents being diagonally opposite from one another and aligned along a line which is at an angle to the longitudinal axis of said vehicle.

2. The improvement of claim 1, wherein said angle is 45°.

3. The improvement of claim 1, wherein said vents open to the top of the interior of said reservoir.

4. In a hydraulic vehicle suspension system having a hydraulic fluid reservoir for receiving, containing and supplying a reserve volume of hydraulic fluid for use by said system, the improvement wherein said reservoir includes a filter, a level sensor and an inlet to said reservoir which opens to an interior of said filter, wherein said level sensor extends through and beneath said interior of said filter.

5. The improvement of claim 4, wherein said level sensor extends into a hollow stem beneath said interior of said filter.

6. The improvement of claim 4, wherein a float is slidably mounted on said stem so as to vary in position according to the volume of fluid in said reservoir.

7. The improvement of claim 4, wherein said level sensor is contained within a hollow tube which is integral with a cover of said filter.

8. The improvement of claim 4, wherein lower side walls of said reservoir taper inwardly toward the bottom of said reservoir.

9. The improvement of claim 4, wherein a hole is formed in a sidewall of said reservoir for mounting a pump.

10. The improvement of claim 7, wherein said cover includes an inlet to said interior of said filter.

11. The improvement of claim 7, wherein said cover fits in a hole in a top of said reservoir and is sealed to said filter and to said top of said reservoir.

12. The improvement of claim 11, wherein said cover is fixed to said top of said reservoir, and said filter is supported by said top of said reservoir.

* * * * *